United States Patent Office 3,705,947
Patented Dec. 12, 1972

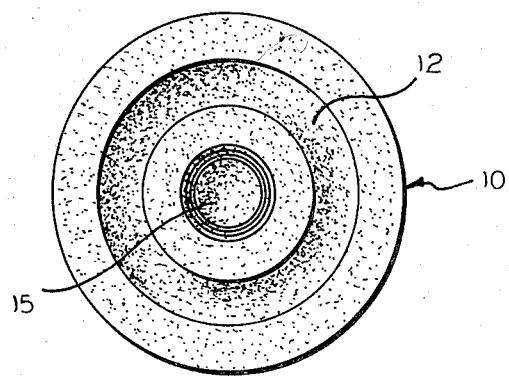
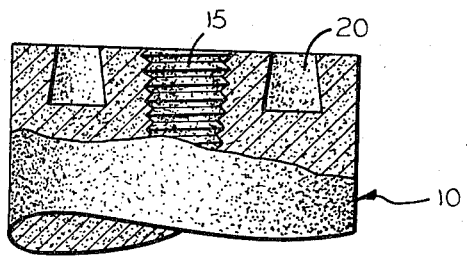
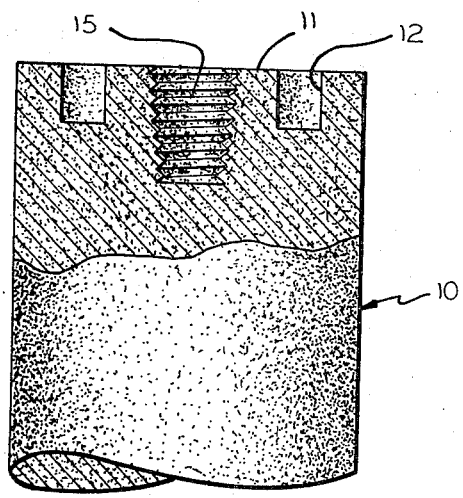
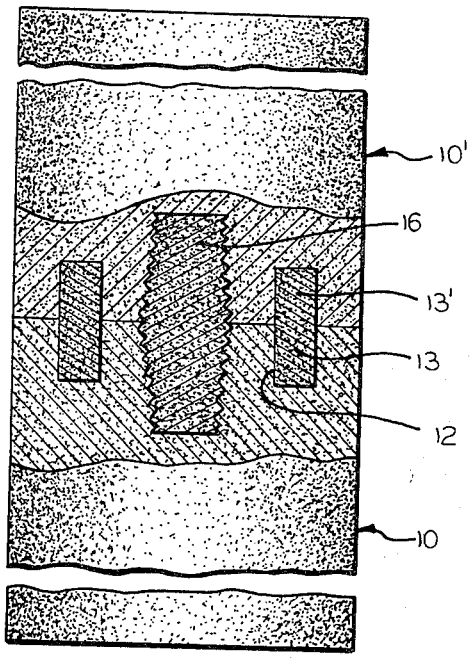
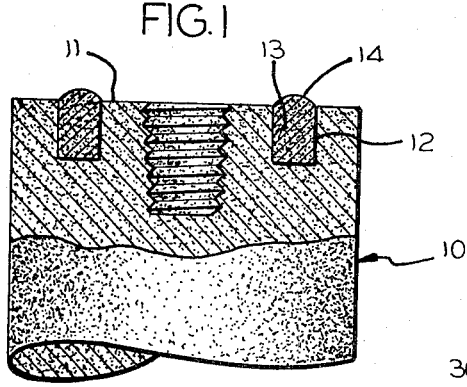
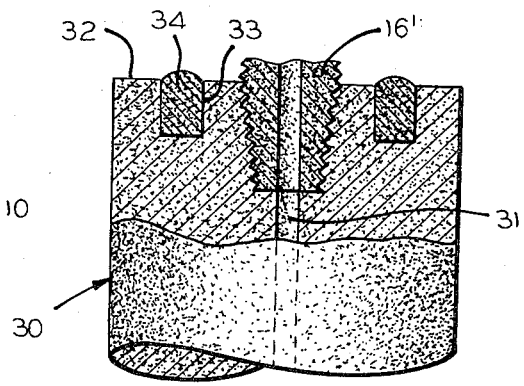

3,705,947
JOINING OF PREBAKED ELECTRODES
John A. Persson, 1411 Woodhill Drive, Gibsonia, Allegheny County, Pa. 15044
Filed Oct. 18, 1971, Ser. No. 190,065
Int. Cl. H05b 7/14
U.S. Cl. 13—18                    2 Claims

ABSTRACT OF THE DISCLOSURE

Prebaked carbon or graphite electric arc furnace electrodes have one or more concentric annular grooves formed in their end faces. The grooves are filled with uncured self-baking carbon or graphite paste such as is used to form electrodes which are entirely self-baked. A new electrode is joined to the stub of an operating electrode by pressing their end faces together, causing the paste in the respective ends to merge. The electrodes are connected mechanically by a conventional threaded nipple. Heat derived from the stub electrode and from resistive heating of the paste cures the paste and effects a sound joint which has good thermal and electric conductivity.

BACKGROUND OF THE INVENTION

Many different methods have been proposed for connecting a new prebaked electrode to an operating partially consumed arc furnace electrode without interrupting operation of the furnace. A widely used method employs an externally threaded tapered nipple which engages internal threads in the counterbored ends of the old and new electrodes. When the electrodes are screwed together severe mechanical stresses are developed in the electrode and nipple and these stresses are enhanced by varying thermal conditions to the extent that the electrodes frequently fracture in the vicinity of the joint. Moreover, recurring thermal expansion and contraction often results in the electrical integrity of the joint being adversely affected, so that resistivity and temperature increase in the joint, thereby compounding the variable stress problem. Sometimes nipples are slotted longitudinally to impart some resiliency and to thereby compensate for thermal expansion and contraction of the nipple and electrode. This has reduced electrode joint fracture but such fractures still happen all too frequently. Various other methods such as joining the electrodes with straight threaded or unthreaded metal pins in their end faces or bonding the pins with conductive paste is another even earlier proposed solution which did not solve the fracture problem. More recently, joints with resilient conductive inserts have been used to some extent but they have the disadvantage of increasing complexity and cost although their thermal expansion compensating characteristics no doubt contribute to reducing fractures.

SUMMARY OF THE INVENTION

It is a primary object of the present invention to provide an electrode joining means which is easy to make and use and which produces a joint that has good thermal and electric conductive properties.

A further object is to provide a method of joining solid or hollow graphite and carbon electrodes of the prebaked type rapidly and enduringly.

Still another object is to provide an electrode joint which is homogeneous and adapted to expand and contract uniformly with the electrode so that fractures due to thermal stresses are reduced.

In general terms, the invention involves casting or machining an annular groove in the end face of each electrode before or after baking the same. The grooves are filled, usually at the site of manufacture, with an uncured paste having a composition similar to the material out of which the electrode is formed. A new electrode may be joined to an old electrode which is operating in a furnace by coupling the electrodes with a conventional threaded carbon or metal nipple. Residual heat in the old electrode and heat produced by electric resistivity in the joint bake the paste and produce a homogeneous integrally bonded stress equalized coupling or joint.

How the above-mentioned and other more specific objects of the invention are achieved will appear from time to time throughout the course of the ensuing description of examples of the invention taken in conjunction with the drawing.

DESCRIPTION OF THE DRAWING

FIG. 1 is an end portion of a solid electrode with a part broken away and in section to show the annular recess and a central threaded nipple receiving hole therein;

FIG. 2 is an end view of the electrode shown in the preceding figure;

FIG. 3 is similar to FIG. 1 except that the annular recess in the end face of the electrode is occupied by electrode paste;

FIG. 4 represents two electrodes in endwise abutting relationship, the region of the joint formed in accordance with the invention being broken away and shown in section;

FIG. 5 is similar to FIG. 1 except that the annular end recess has a different configuration; and FIG. 6 shows a hollow core electrode adapted for being joined with another in accordance with the invention.

DESCRIPTION OF A PREFERRED EMBODIMENT

FIG. 1 shows an end portion of an electrode 10 having a flat end face 11. A part of the end portion is broken away to reveal that the end face has an annular recess 12 and a tapered threaded nipple receiving socket 15 formed in it. The recess is circular and concentric with the electrode as can be seen in FIG. 2. By way of example and not limitation, for an electrode 10 having an outside diameter of 36 inches, annular recess 12 may have an axial depth of 2 inches and a radial width of 2 inches.

As is well known, arc furnace electrodes of the type here under consideration are made by forcing a carbon or graphite paste through a die and then baking the formed electrode in an oven to cure and solidify it. For the purposes of the invention, recess 12 in the end face of the electrode 10 may be machined after the electrode is baked or a suitable forming die having a projection which complements the recess may be inserted and withdrawn from the end of the soft unbaked material to form the recess. Threaded nipple socket 15 may be bored and threaded by as has been done traditionally.

At the site of manufacture or use, annular recess 12 of the electrode is filled with a quantity of electrode paste 13 which is in a plastic state. The recess should preferably be slightly overfilled with paste as suggested by the slight roundness which the end of the paste exhibits in FIG. 3. If the electrode 10 is made of carbon, then a carbon paste 14 should be used with that electrode. If the electrode 10 is made of graphite, it is preferable that a graphite paste 13 be used. Suitable electrode paste compositions are those which are regularly used for continuous forming of self-baking graphite and carbon electrodes, respectively.

When an electrode is descending as it is being consumed in an arc furnace, its end face 11 lies in a horizontal plane, thus presenting the axial end 14 of paste annulus 13 upwardly as in FIG. 3. A full-length new electrode, which is prepared similarly to the one in FIG. 3, is then engaged in end-to-end contact relationship with the existing electrode 10 by means of a threaded nipple 16. The end faces of the paste annuli merge with each other to form a homogeneous joint insofar as the paste is concerned. FIG. 4 demonstrates how the new electrode 10' is pressed against the old electrode 10 so that the paste annuli 13' and 13 merge with each other to form one continuous annulus. The paste is pressed into intimate contact relation with the interior walls of annulus 12 so that good electric and thermal conductivity is established immediately. Residual heat in old electrode 10 immediately starts curing of paste 13 and as soon as new electrode 10' begins conducting, additional joule heat or heating by electric resistivity in the paste occurs. This accelerates the baking process and ultimately results in substantial integration of the electrode paste annulus and the parent electrodes.

As is well known, arc furnace electrodes of the type here under discussion conduct several thousands of amperes during operation. Owing to the so-called skin effect the conducting electron current is confined to the periphery of the electrode. The core or center of the electrode, therefore, conducts much less current than the cross section near the periphery. In accordance with the invention, the paste annulus is located near the periphery of the electrodes where current density is the greatest which means that a good continuous conductive path is established where it is needed most. Moreover, having the paste annulus 13 located near the periphery of the joined electrodes permits the joint to better resist bending moments and to relieve stresses which have heretofore frequently resulted in fracture of the electrodes in the vicinity of the joints.

The cross section of annular recess 12 need not be rectangular as shown in FIG. 1 but it may have other configurations as well. For instance, in FIG. 5 an annular recess 20 has a dovetail cross section which diverges away from the end face axially of the electrode 10. A recess of this configuration is preferably machined into the end face of the electrode after it is baked to a solid state and cooled. It is also acceptable to form the recess with sides that diverge toward the end face of the electrode or, in other words, produce a recess which has a V-shape cross section which is truncated at the apex. This results in the end faces of the paste annuli having a larger area to thereby enhance physical strength and conductivity at the joint.

In FIG. 6 the new electrode joining means is applied to a cylindrical electrode 30 which has a central bore 31. The end face 32 is provided with an annular recess 33 which may be occupied by electrode paste 34 as in the previous embodiments. In this example the threaded electrode joining nipple 16' has a central bore which aligns with the bore 31 when the electrodes are screwed together.

Although the new electrode joining means has been described in reference to electrodes which are cylindrical in cross section and most advantageously use a circular annular recess for accommodating the paste, it will be understood by those skilled in the art that the invention is equally applicable to joining electrodes which are other than circular in cross section. For instance, if electrode 10 shown in FIGS. 1 and 2 had a square cross section, a circular recess 12 could still be used, or in the alternative, a square or otherwise shaped recess could be impressed in the end face of the electrode when it is being formed and before it is baked. It is also possible to have the paste annulus in only the leading or trailing end of one electrode and let this end abut the flat end of another electrode.

Although embodiments of the invention have been described in considerable detail, such description is to be considered illustrative rather than limiting for the invention may be variously embodied and is to be limited only by interpretation of the claims which follow.

I claim:
1. A method of joining electrodes comprising:
   (a) forming corresponding recesses in the respective end faces of prebaked electrodes which are to be joined, at least a portion of the recesses overlapping when said electrodes are aligned end-to-end,
   (b) filling said recesses with unbaked electrode forming paste of a composition similar to that of the electrodes, the height of said paste filling being slightly greater than the depth of said recess,
   (c) pressing the end faces of said electrodes together to cause the electrode paste in each of them to join, and
   (d) baking the joined paste to solidify the same.
2. An arc furnace electrode joint comprising:
   (a) a pair of prebaked electrodes in end-to-end contact,
   (b) at least one recess formed in each electrode end in an overlapping relationship with a recess in the abutting electrode,
   (c) unbaked paste disposed in each of said recesses, the height of said paste being slightly greater than the depth of the recess whereby a substantially homogeneous solid joint is formed by baking said paste.

References Cited

UNITED STATES PATENTS

| | | | |
|---|---|---|---|
| 2,894,776 | 7/1959 | Johnson | 287—127 E |
| 2,093,390 | 9/1937 | Wyckoff | 13—18 UX |

ROY N. ENVALL, JR., Primary Examiner

U.S. Cl. X.R.

287—127 E; 313—357